Figure 7:
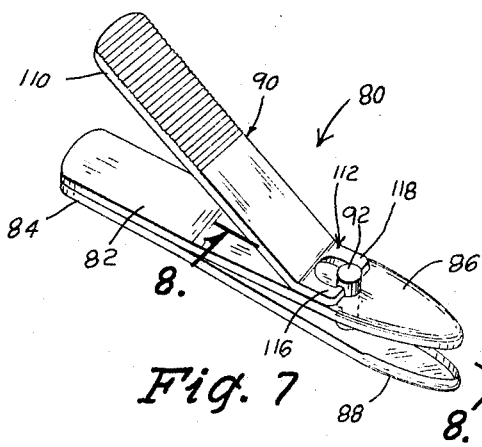

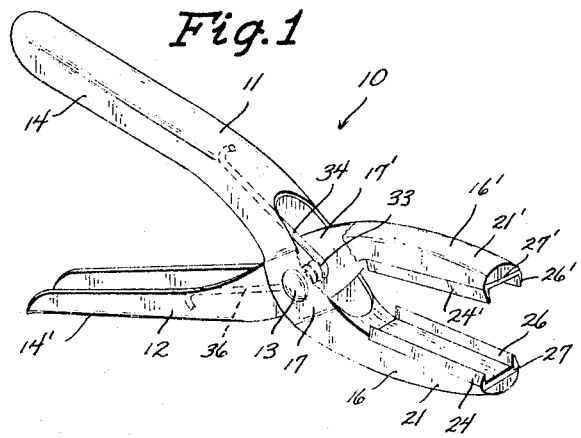
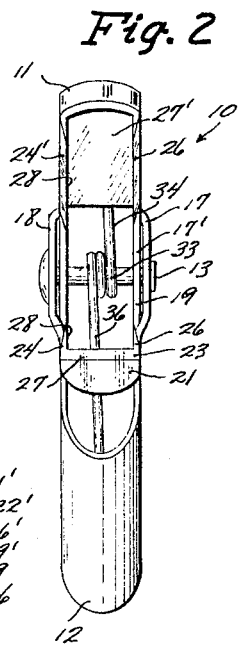
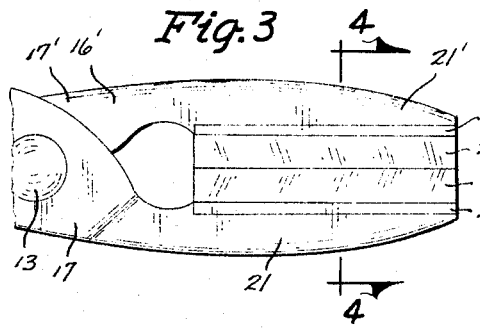
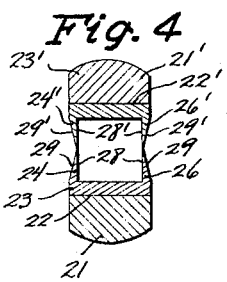
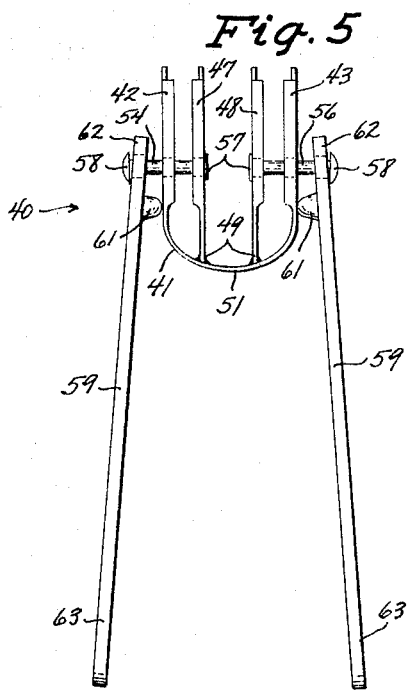
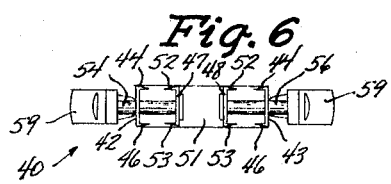
INVENTOR
JOSEPH B. DAVIS Aug. 2, 1966  J. B. DAVIS  3,263,331
ANIMAL TEETH CUTTERS
Filed April 13, 1964                                                     2 Sheets-Sheet 2

INVENTOR
JOSEPH B. DAVIS
BY Dick + Zarley
ATTORNEYS

United States Patent Office 3,263,331
Patented August 2, 1966

3,263,331
ANIMAL TEETH CUTTERS
Joseph B. Davis, deceased, late of Lohrville, Iowa, by Margaret H. Davis, administratrix, Lohrville, Iowa, assignor of one-third to Margaret H. Davis, one-third to Joyce G. Davis, and one-third to Axel Davis
Filed Apr. 13, 1964, Ser. No. 359,822
2 Claims. (Cl. 32—47)

This invention relates to devices for use on animals, particularly domesticated farm animals such as pigs, and relates specifically to cutters for certain teeth of baby teeth.

This is a continuation-in-part application of co-pending application No. 236,279, now abandoned, filed November 8, 1962.

It is well known to those skilled in this field that baby pigs develop what are commonly called needle or wolf's teeth. These teeth are located near the front of the mouth and include four pairs of teeth, two pair up and down on each side of the jaw. Each upper and lower pair of teeth are directly above and below each other, respectively.

Removal is deemed necessary due to the fact that the baby pigs bite each other with these teeth causing possible infection. It is therefore an object of this invention to provide a new tool for the easy removal of baby pig's teeth, commonly called wolf's teeth.

Another object of this invention is to provide a teeth cutting tool for ready insertion into a baby pig's mouth for quick and positive removal of the upper and lower pairs of teeth on either side of the jaw.

Yet another object of this invention is to provide a pig's teeth removal device having upper and lower shear members capable of cutting off both upper and lower pairs of teeth.

Still another object of this invention is to provide a pair of teeth cutters having scissors-type shear members pivotally movable toward and away from each other into cutting engagement, said shear members so spaced laterally and vertically as to simultaneously cut all four upper and lower pairs of teeth on both sides of the jaw of the pig.

It is still another object of this invention to provide a pair of teeth cutters which have jaw portions so shaped that accidental cutting of the animal's teeth gums will be avoided.

An object of this invention is to provide a pair of animal teeth cutters which may be operated with two fingers on one hand.

Another object of this invention is to provide a pair of animal teeth cutters which have finger-shaped jaw portions which minimize the difficulty of positioning the device in the animal's mouth for cutting teeth.

Another object of this invention is to provide a pair of animal teeth cutters which are normally spring biased opened.

Another object of this invention is to provide a pair of animal teeth cutters having mating blade edges extending along the entire peripheral edge of each of the cutters.

Another object of this invention is to provide a pair of cutters capable of attaining the above designated objectives which is economical of manufacture, simple of construction, and effective in operation.

Figure 8:
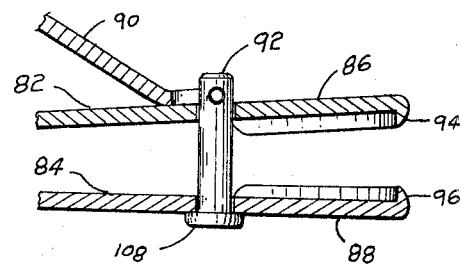
Figure 9:
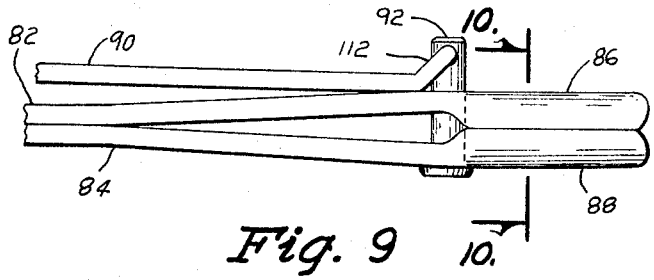
Figure 10:
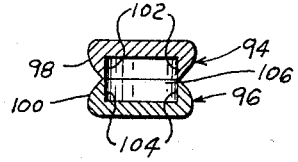
Figure 11:
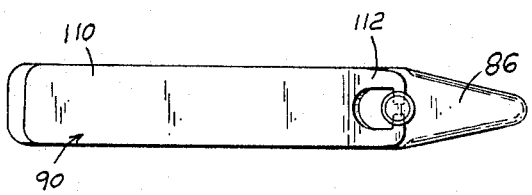
Figure 12:
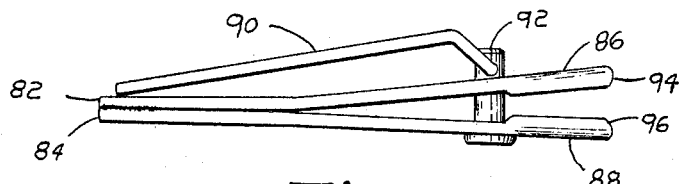

These objects and other features and advantages of this invention will become readily apparent to those skilled in the art upon reference to the following description when taken into consideration with the accompanying drawing, wherein:

FIG. 1 is a perspective view of the teeth cutters of this invention;
FIG. 2 is an enlarged front elevational view of the cutters with their jaws in an open position;
FIG. 3 is an enlarged fragmentary side elevational view of the closed jaws of the cutter;
FIG. 4 is a vertical sectional view taken along the line 4—4 in FIG. 3;
FIG. 5 is a plan view of a modified pair of cutters, shown in the open position;
FIG. 6 is a front elevational view of the modified form of the invention of FIG. 5;
FIG. 7 is a perspective view of a third modified pair of cutters shown in the open position;
FIG. 8 is an enlarged fragmentary cross-sectional view taken along line 8—8 in FIG. 1 showing in particular the finger-shaped end portions of the jaw sections of the cutters;
FIG. 9 is a fragmentary side elevation view of the cutters shown in FIG. 7;
FIG. 10 is a cross-sectional elevation view taken along line 10—10 in FIG. 9 showing in particular the cross-sectional shape of the cutting blades on the finger portions of the jaw sections;
FIG. 11 is a top plan view of the teeth cutting device of FIG. 7; and
FIG. 12 is a side elevation view similar to FIG. 9 but showing the actuating member in its inoperative position.

Referring now to the embodiment of FIGS. 1 through 4, the invention in the form of a pair of pig's teeth cutters is indicated generally at 10. The cutters 10 include a pair of elongated members 11 and 12 of substantially identical construction, pivotally connected at their midpoints by a pivot pin 13.

The member 11 is elongated, U-shaped and includes a hand grip 14 at one end and a slightly curved cutting head 16 at the other end. Intermediate the ends is a center pivot section 17 which is curved slightly in a reverse manner relative to the curvature of the cutting head 16. The side walls 18 and 19 (FIG. 2) of the center section 17 are transversely spaced apart a distance greater than the transverse width of the remainder of the member 11 so as to receive the center section 17' of the other member 12.

The cutting head 16 includes a generally solid jaw section 21 (FIGS. 3 and 4) to the inner surface 22 of which is attached a cutting section 23. A pair of transversely spaced, elongated knife-edged blades 24 and 26 (FIG. 4) are formed integral with a transverse portion 27 of the cutting section 23. Each blade extends in the direction of pivotal movement of the members 11 and 12, and has a smooth, straight inner surface 28. The inner surfaces 28 of the blades 24 and 26 extend parallel to each other. To prevent from cutting the skin and flesh of the baby pigs, the outer surfaces 29 (FIG. 4) of each blade is beveled inwardly from the outer surface 31 of the jaw section.

The other member 12 is substantially identical to the described member 11 except for the difference in widths of the center sections 17 and 17', and like parts are indicated by like reference numerals each having a prime. Referring to FIGS. 2 and 3, wherein the jaws 21 and 21' are respectively open and closed, the perfect mating relationship of the blades 24, 24' and 26, 26' is clearly illustrated. Thus, upon a closing of the jaws, the outer sharp edges of all the blades contact each other.

To bias the cutter members 11 and 12 to a normally open position wherein the jaw sections 21 and 21' are spaced from each other, a biasing spring 33 (FIGS. 1 and 2) is provided. The spring 33 is wrapped around the pivot pin 13, and has one end 34 pressed against the member 11 and the other end 36 pressed against the member 12.

In actual size, each member 11 and 12 has a length of approximately six inches and an overall width of approximately one-half inch. The transverse spacing between the inner surfaces 28 of opposed blades 24, 26 and 24', 26' is a preferred one-quarter to three-eighths inch, and the height of the teeth is one-eighth inch. A preferred length of the blades is one inch.

By this arrangement, upon insertion of the cutters 10 into the mouth of a baby pig, wherein the jaws 21 are held in a generally horizontal plane—assuming the pig's upper and lower jaws are vertically spaced, the jaws 21 are sufficiently laterally spaced so that the lower blades 24, 24' extend on either side of the lower pair of teeth on one side of the pig's lower jaw, and the upper blades 26, 26' extend on either side of the upper pair of teeth on the respective side of the pig's jaw. Thus, by pressing the hand grips 14 and 14' toward each other, the cutter jaws 21 and 21' are closed toward each other and the "wolf-teeth" caught therebetween are cut.

Referring now to the modified embodiment of FIGS. 5 and 6, a pair of cutters 40 is illustrated which comprise a U-shaped member 41 of spring steel or the like. The legs of the member 41 includes a pair of jaws 42 and 43 each of which has a pair of normally vertically spaced blades 44 and 46 identical in formation and structure to the blades 24 and 26 of the cutters 10.

A second pair of jaws 47 and 48 are secured at one of their ends 49 to the base 51 of the member 41, and each has a pair of vertically spaced blades 52 and 53 again identical to the blades 24 and 26. The inner jaw 47 is adapted to co-act with the opposite transversely spaced outer jaw 42, and the other inner jaw 48 is adapted to co-act with the opposite transversely spaced outer jaw 43.

The co-action between these jaws is made possible by providing aligned bores in all four jaws through which a pair of axially aligned shafts 54 and 56 extend, in a loose fitted manner. A stop 57 is provided in each inner end of each shaft, and another stop 58 is formed on the outer end of each shaft. Loosely and slidably mounted on each shaft 54 and 56, intermediate the outer stop 58 and the adjacent outer jaw, is an elongated lever 59. Each lever 59 has a projection 61 formed thereon intermediate the slidably mounted end 62 and the handle end 63, and which projection 61 is adapted to engage the adjacent outer jaw.

It may be readily appreciated that upon manual compression of the handle ends 63 toward each other, the action of the levers 59 simultaneously tends to pivotally pull the inner jaws 42 and 43 outwardly while pivotally pressing the outer jaws 47 and 48 inwardly. Referring particularly to FIG. 6, the cutters 40 is depicted in its normal position ready for insertion into the baby pig's mouth.

The jaws 42 and 47 are adapted to straddle the upper and lower "wolf's teeth" on one side of the pig's jaw, whereas the jaws 43 and 48 are spaced to straddle the upper and lower teeth on the other side of the jaw. At the same time, the upper two pair of blades 44 and 52 (FIG. 6) are adapted to straddle the upper pairs of teeth, and the lower two pair of blades 46 and 53 are adapted to straddle the lower pair of teeth.

Thus, upon compression of the handle ends 63 toward each other, all four upper pairs of "wolf's teeth" are cut by action of the two pairs of jaws. The yieldable nature of the member 41 will effect a return of the jaws to their normal position best illustrated in FIGS. 5 and 6.

Referring now to the third embodiment of this invention referred to by the reference numeral 80 in FIGS. 7 through 12, it is seen that it essentially comprises only four components. A pair of jaw sections 82 and 84 are hingedly connected at one end by a weld or the like and are made of flexible resilient metal material for normally biasing their opposite ends apart. The opposite ends of the jaw sections 82 and 84 are finger-shaped as indicated at 86 and 88 in FIG. 1. The third and fourth components of this embodiment are the actuating member 90 and the pin 92 connecting it to the jaw sections 82 and 84 adjacent the finger portions 86 and 88.

As best shown in FIGS. 8 and 10, the inner sides of the finger portions 86 and 88 are provided with continuous peripheral mating blades 94 and 96 which are beveled transversely inwardly of the longitudinal axis of the jaw sections 82 and 84. As is particularly seen in FIG. 10, the blades 94 and 96 have arcuate convex outer surfaces 98 and 100, which terminate in knife sharp edges which are in mating engagement with each other. The blades 94 and 96 are provided with aligned vertical inner surfaces 102 and 104 respectively. Also, as seen in FIG. 4, a chamber 106 is formed by the inner surfaces 102 and 104 of the blades 94 and 96. The rounded convex outer surfaces 98 and 100 assure that the cutting edges of the blades 94 and 96 are spaced sufficiently from the gum portions of the animal's jaw surrounding the teeth being cut. It has been found that the convex surface is superior in this respect since it jets outwardly from the cutting edges as compared with a flat tapered outer surface as illustrated in FIG. 4 at 29 and 29' illustrating the first embodiment of this invention. Moreover, the pointed finger-shaped portions 86 and 88 enable the cutters to be used in close quarters within the confines of the animal's mouth. The cutting blades 94 and 96 extending around the entire periphery of the finger portions 86 and 88 makes it possible to cut teeth at almost any location within the animal's mouth.

The pin 92 extends through the jaw sections 82 and 84 intermediate its ends and is held thereon by a flat head 108 which bears against the outer surface of jaw section 84. The opposite end of the pin 92 is provided with small holes in opposite sides. The actuating member 90 includes a handle portion 110 which terminates in a pin engaging portion 112 which extends at an angle thereto. The juncture between the portions 110 and 112 serve as a fulcrum and is adapted to bear against the top outer surface of the jaw section 82 as shown in FIG. 9. Transverse pivot portions 116 and 118 are provided on the outer end of the pin engaging portion 112 and are pivotally received in the holes formed in the pin 92.

Thus it is seen that in operation the finger portions 86 and 88 having the blades 94 and 96 may be moved into mating cutting engagement by depressing the actuating member handle portion 110 downwardly toward the jaw sections 82 and 84 as shown in FIG. 9. When the teeth cutters of this embodiment are not in use the actuating member 90 may be turned over to its position in FIG. 12 by rotating it on the pin 92 thereby positioning the handle portion 110 at an angle extending into the jaws 82 and 84 to provide a compact device.

In summation, three embodiments have been shown and described of a simple effective pair of baby pig's teeth cutters, which are readily operable to cut selected upper or lower teeth in the animal's mouth by manual manipulation of the teeth cutter's device.

Some changes may be made in the construction and arrangement of my animal teeth cutters without departing from the real spirit and purpose of my invention, and it is my intention to cover by my claims, any modified forms of structure or use of mechanical equivalents which may be reasonably included with their scope.

I claim:

1. A device for cutting the wolf teeth on both sides of the jaw of an animal, comprising,
   a pair of jaw sections hingedly connected together at one end, said sections having finger shaped free end portions,
   means for normally biasing said finger portions apart, a pin means interconnecting said jaw sections and having a free end exposed outwardly of one jaw section, an actuating member pivotally connected at one end to said exposed end of said pin means, a fulcrum for engagement between said actuating member and said one jaw section, a finger engaging portion outwardly of said fulcrum for operating said actuating member to close said jaws, said finger shaped portions each having blade sections on either side, each of said blade sections having an outer arcuate convex surface being beveled inwardly toward the transversely opposite blade section.

2. The device of claim 1 wherein an intermediate portion having an outer face arcuate and convex in cross-section connects each of said blade sections on each side of each of said finger portions to form a continuous arcuate convex outer surface along the peripheral edges of said finger portions facing each other.

References Cited by the Examiner

UNITED STATES PATENTS

| | | | |
|---|---|---|---|
| 114,674 | 5/1871 | Griffith | 30—229 |
| 186,726 | 1/1877 | Hamilton | 30—178 |
| 617,955 | 1/1899 | Clement | 32—46 |
| 642,973 | 2/1900 | Galbreath | 30—173 |
| 809,842 | 1/1906 | Pulvitt | 30—176 |
| 813,598 | 2/1906 | Sylvester | 30—178 |
| 846,565 | 3/1907 | Havell | 30—28 |
| 865,551 | 9/1907 | Wells | 30—178 |
| 1,686,723 | 10/1928 | Anderson | 30—254 |
| 2,138,726 | 11/1938 | Cartwright | 30—173 |
| 2,600,803 | 6/1952 | Prather | 32—62 |
| 2,742,696 | 4/1956 | Williams | 30—229 |
| 2,774,138 | 12/1956 | Gowdey | 30—28 |

RICHARD A. GAUDET, *Primary Examiner.*

J. W. HINEY, JR., *Assistant Examiner.*